United States Patent Office 3,487,100
Patented Dec. 30, 1969

3,487,100
METHOD FOR TREATING CRUDE BIS-β-HYDROXYETHYL TEREPHTHALATE
Hirokazu Arai and Tsurutake Yano, Ibaraki-shi, Japan, assignors to Sumitomo Chemical Company, Ltd., Osaka, Japan, a corporation of Japan
No Drawing. Filed May 12, 1966, Ser. No. 549,494
Claims priority, application Japan, May 14, 1965, 40/28,458
Int. Cl. C07c 69/82
U.S. Cl. 260—475                                    5 Claims

ABSTRACT OF THE DISCLOSURE

Purified bis-β-hydroxyethyl terephthalate having a high purity is prepared by hydrogenating crude bis-β-hydroxyethyl terephthalate obtained by reacting ethylene oxide with crude terephthalic acid obtained by oxygen-oxidation of a p-dialkylbenzene or a thermal rearrangement reaction of potassium salts of benzene carboxylic acids, said hydrogenation being effected at a temperature of 50° to 100° C. in the presence of a hydrogenation catalyst in aqueous solution. Said purified bis-β-hydroxyethyl terephthalate can be used as the starting material for the synthesis of polyesters.

---

This invention relates to a method for treating bis-β-hydroxyethyl terephthalate (hereinafter abbreviated as BHET) for the purpose of obtaining BHET which has little of such impurities as will cause its polymer to be colored.

BHET is important as a raw material or intermediate material for making polyethylene terephthalate.

A method for manufacturing BHET synthetically from terephthalic acid and ethylene oxide is considered economical but crude BHET obtained by this method is contaminated with those coloring substances which are contained mainly in the raw material terephthalic acid. They cause polyethylene terephthalate to be colored, so they must be eliminated or converted into non-coloring substances in advance before the polymerization. For that purpose an aqueous solution of BHET is generally treated with an adsorbing discoloring agent such as active carbon etc. It is impossible, however, to decrease those coloring substances sufficiently by such a method. On the other hand, BHET having little coloring substances can be obtained by using terephthalic acid, purified in advance, as raw material, but a tremendous amount of expenses are required for its refining because a suitable solvent is not found in any prior arts of it and further even if BHET is made using such purified terephthalic acid, for obtaining its polymer it must be treated with active carbon before its polymerization. Generally speaking, the polymer of BHET is required to have a Hazen number of less than 180. Even if BHET is purified by the above-mentioned troublesome treatment, the Hazen number of its polymer can be reduced only to 110–180.

An object of the present invention is to provide a method for producing BHET having little coloring substances advantageously on a commercial scale by a simple operation.

Such an object and other advantage can be attained by the method of the present invention which consists in reducing an aqueous solution of BHET by gaseous hydrogen in the presence of a catalyst selected from the group consisting of platinum, palladium, rhodium, ruthenium, nickel and cobalt. It is a surprising and unexpected discovery that coloring substances of BHET can be decreased efficiently and to a sufficiently satisfactory extent by a simple operation, even if it is synthesized from crude terephthalic acid, if it is reduced by hydrogen gas in the presence of an ordinary hydrogenation catalyst.

On operating this invention, an aqueous solution of crude BHET is first prepared. Though the quantity of water used in the above is not necessarily limited, it is generally suitable to use water in a quantity 2–10 wt. times as much as BHET, as it is very soluble in water. Depending on the conditions of synthesizing BHET from ethylene oxide and terephthalic acid, the dimer of BHET may be produced only a little. As the said dimer is not dissolved in water, it would be better to separate it by filtration on preparing an aqueous solution of BHET. On synthesis of BHET, production of its dimer can be suppressed under the condition that terephthalic acid in solid phase always exists by 0.5 part, preferably more than 2 parts, to 100 parts of the reaction solution. But if it is too much, filtration of terephthalic acid becomes troublesome, so it had better be less than 15 parts.

The aqueous solution of BHET thus obtained is reduced in the presence of a hydrogenation catalyst by hydrogen gas. This treatment had better be carried out, until the substances which cause coloration are reduced sufficiently, suitably at 50–100° C. for 1–180 minutes. The object of this reducing treatment can be achieved sufficiently even at more than 100° C. but at too high temperature the dimer of BHET is apt to be produced. On the other hand, even if a high temperature is not used, the reduction can be carried out sufficiently using a concentrated aqueous solution of BHET and a commercially satisfactory rate of hydrogenation can be also attained, as the treating temperature may well be below 100° C. in general. But the reduction at too low temperature is not desirable because a concentrated aqueous solution of BHET cannot be used in that case.

As the catalyst to be used, platinum, palladium, rhodium, ruthenium, nickel or cobalt which is usually known as hydrogenation catalyst or palladium chloride, nickel oxide or cobalt nitrate which is reduced to each of those metals under the conditions of reduction can be used. Those catalysts can be used with or without their carrier such as active carbon, asbestos, diatomaceous earth or the like.

The reducing treatment may be carried out by blowing hydrogen at the atmospheric- or a superatmospheric-pressure into an aqueous solution of BHET while suspending the powdery catalyst in the latter by agitation as in the discoloration by active carbon or it may also be carried out by effecting hydrogenation in the gas phase, while allowing an aqueous solution of BHET to flow down the column packed with granular catalysts. As those catalysts adsorb a great quantity of hydrogen, it is possible to make them adsorb hydrogen in advance of the reducing treatment. In this case, hydrogen need not be blown into the aqueous solution when the above-mentioned reducing treatment of the suspension system is adopted. When the reducing treatment is carried out in the system using a packed column, only the operation of flowing the aqueous solution of BHET through the column will be sufficient. Thus the operation becomes very simple.

In the case of the said reduction of the suspension system, the quantity of the catalyst to be used is preferably within a range of 0.01 to 2 wt. percent based on the weight of BHET.

After the reduction is finished, the solution thus obtained is cooled to produce the crystals of BHET, after it is separated by filtration from the suspended catalyst if it is contained therein. The cooling temperature in this case is preferably within a range of 25 to 50° C. On this crystallization, the reduction products remain partly in the solution and are contained partly in BHET. But they do not cause the polymer to be colored any more. The mother liquid after BHET is separated from it can be circulated for re-use. By using this method the treatment can be carried out with decrease of the loss of BHET owing to its dissolution.

According to the above mentioned treatment, such coloring substances as aldehydes, benzophenones and fluorenones which are contained in crude BHET can be reduced efficiently and easily, so great quantities of coloring substances in the BHET which have been synthesized using crude terephthalic acid can be generally decreased at once to 5 to 100 p.p.m. and when BHET obtained thereafter is polymerized, the polymer having a Hazen number of 100–160 can be produced. Further highly pure BHET with extremely little coloring substances can be obtained if active carbon treatment is carried out concurrently before or after the reducing treatment and if this BHET is polymerized, the very good polymer having a Hazen number of 50–80 can be produced.

As it has been described above, the method of this invention decreases the coloring substances very efficiently, highly pure BHET having little coloring substances can be obtained even if such a refining treatment, troublesome and requiring much heat, as dissolution-crystallization of terephthalic acid or active carbon treatment is not carried out concurrently, and if BHET thus obtained is polymerized, its polymer, equal or superior in quality to the conventional polymer, can be produced. Further the concurrent application of the active carbon treatment makes it possible to obtain an especially highly pure BHET and if this BHET is polymerized, its polymer is much superior in quality to the conventional polymer. According to the method of this invention, as the solubility of BHET in water is a several hundreds or thousands of times of the solubility of terephthalic acid in water and crystallized easily by cooling, so it can be treated in a highly concentrated aqueous solution. Therefore its treating apparatus can be diminished in size and expenses for its refining can be decreased substantially.

The method of this invention can be applied generally to refining the crude BHET which is synthesized from crude terephthalic acid containing the above-mentioned coloring substances such as aldehydes, benzophenones, fluorenones and others.

This invention is illustrated but not limited by the following examples.

EXAMPLE 1

500 wt. parts (hereinafter expressed simply as parts) of terephthalic acid (having a terephthalaldehyde content of 0.35% and an absorbency [1] of 1.52) which was obtained by air oxidation of paraxylene was reacted with ethylene oxide at 80° C. and under normal pressure in 1,000 parts of 1 N aqueous solution of sodium hydroxide. When the precipitate of terephthalic acid was decreased to about 50 parts, 500 parts of terephthalic acid was further added. Such continuance of the reaction was repeated until 1,500 parts of terephthalic acid was treated after all. Then a small quantity of unreacted terephthalic acid was separated by filtration from the reaction product thus obtained and the resultant crystals were separated with a centrifuge and then recrystallized with 4,000 parts of water. As a result, 1,850 parts of crude BHET was obtained. Its absorbency was 0.97.

500 parts of the crude BHET was dissolved on heating at 75° C. in 1,000 parts of water. The resultant aqueous solution was introduced into a 2 l. four-necked flask. After 2.5 g. of a palladium catalyst (palladium: 5%, the carrier: active carbon) was added to it, its reducing treatment was carried out by agitating it while hydrogen gas was being passed into it at the atmospheric pressure. After two hours, the catalyst was separated by filtration from the treated solution, the resultant solution was cooled at 25° C. to crystallize BHET and the product was separated by filtration and dried. As a result, 460 parts of purified BHET was obtained. The purified BHET had an aldehyde content [2] of 25 p.p.m. and an absorbency of 0.12. It was polymerized using an antimony system catalyst at 270° C. and under a vacuum of 0.1 mm. Hg. Polyethylene terephthalate thus obtained was a good polymer having an intrinsic viscosity of 0.62, a Hazen number of 160 and a melting point of 265° C.

As the result of carrying out the reducing treatment with 2.5 g. of active carbon in place of the palladium catalyst, for comparison's sake, there was obtained BHET having an absorbency of 0.61 and an aldehyde content of 1,500 p.p.m.

EXAMPLE 2

Similarly to Example 1, the reducing treatment was carried out and the catalyst was separated by filtration. To the solution thus obtained, 500 parts of warm water was added and then 8 g. of active carbon (the special grade, Sakura) was added at 70° C. before the solution was agitated for 15 minutes and then filtered. That operation was repeated three times. The solution thus obtained was cooled to crystallize BHET. The resultant crystals were separated by filtration, dried and purified. As a result, 450 parts of purified BHET was obtained.

The purified BHET had an aldehyde content of 2.5 p.p.m. and an absorbency of 0.015. As the result of polymerizing it to obtain polyethylene terephthalate, similarly to Example 1, the polymer was of a very good quality, having an intrinsic viscosity of 0.65, a Hazen number of 70 and a melting point of 264° C.

When 500 parts of water was not added immediately before the active carbon treatment, BHET of the same good quality could be obtained by carrying out three times the treatment mentioned above using 10 g. of active carbon.

EXAMPLE 3

40 parts of the same crude BHET as in Example 1 was dissolved at 70° C. in 200 parts of water. The resultant solution was reduced at 75° C. for 60 minutes in a stainless autoclave while hydrogen was being added to it at a pressure of 10 atg. in the presence of hydrogenation catalysts listed in Table 1. Then the solution obtained after the catalyst was separated by filtration from it was cooled to crystallize BHET. The resultant crystals of BHET were separated by filtration and dried. As a result, purified BHET was obtained by about 38 parts. The quantities of the catalysts and the analysis of BHET thus obtained were as shown in Table 1.

TABLE 1

| Catalyst | Quantity of catalyst (g.) | Aldehyde content (p.p.m.) | Absorbency |
|---|---|---|---|
| (1) Platinum (Pt, 5%, carrier active carbon) | 0.2 | 20 | 0.15 |
| (2) Palladium (Pd, 10%, carrier, asbestos) | 0.2 | 40 | 0.15 |
| (3) Nickel (Ni, 1%, carrier, diatomaceous earth) | 0.4 | 98 | 0.18 |
| (4) Palladium black | 0.1 | 40 | 0.21 |
| (5) Rhodium (Rh, 5%, carrier, asbestos) | 0.4 | 70 | 0.27 |
| (6) Palladium chloride | 0.2 | 50 | 0.24 |
| (7) Raney nickel | 0.4 | 84 | 0.18 |
| (8) Cobalt nitrate | 0.1 | 96 | 0.19 |
| (9) Ruthenium (Ru, 5%, carrier, carbon) | 0.2 | 30 | 0.11 |

EXAMPLE 4

A reaction tube of titanium (20 mm. in inner diameter and 1 m. in length) was filled with a hydrogenation catalyst consisting of 2% of palladium adhered to grannular active carbon, 5 mm. in diameter, as carrier. After the reactor was flushed with nitrogen, water was passed and then hydrogen gas was passed through it for

---

[1] The absorbency was that at 380 mμ obtained by dissolving terephthalic acid in an aqueous solution of potassium hydroxide in a concentration of 10 g./100 cc. and measuring it with a 5 cm. cell.

[2] The aldehydes were identified by determining quantitatively aldehydes and ketones as 4-carboxybenzaldehyde by the polarographic method, in which benzophenone carboxylic acid and fluorenone carboxylic acid were also included.

making hydrogen adsorbed. In the reactor, an aqueous solution, which was obtained by dissolving 500 parts of the crude BHET, synthesized under the same conditions as in Example 1, in 5 wt. times as much of water, was allowed to flow down at 75° C. at a flow velocity of 50 cc./minute. The solution was accumulated at the bottom was taken out and cooled to crystallize BHET. The resultant crystals of BHET were separated by filtration and dried. As a result, 470 parts of purified BHET was obtained. The aldehyde content of the BHET was below 5 p.p.m. and its absorbency was 0.042. As the result of polymerizing the BHET similarly to Example 1, an extremely good polyethylene terephthalate having an intrinsic viscosity of 0.61, a Hazen number of 100 and a melting point of 267° C. was obtained.

EXAMPLE 5

A reaction product mainly comprising di-potassium terephthalate was obtained by reacting potassium benzoate under a pressure of carbon dioxide gas using cadmium oxide as catalyst. The said product was dissolved in 10 wt. times as much of water and the insoluble matters were separated by filtration. An aqueous solution thus obtained was made to react with benzoic acid in two steps. As a result, crude terephthalic acid was obtained. Its absorbency was 0.82.

600 parts of the said terephthalic acid was made to react with ethylene oxide supplied at a pressure of 0.5 atg. at 90° C. in 1,000 parts of a 1 N aqueous solution of sodium hydroxide. When the precipitate of terephthalic acid became nearly extinct, the reaction solution was cooled. After the crystals were separated with a centrifuge, they were recrystallized further with 1,800 parts of water. As a result, 580 parts of crude BHET was obtained. Its absorbency was 0.70.

500 parts of the crude BHET was dissolved on heating at 75° C. in 1,500 parts of water. 3 l. of the resultant solution was introduced into a 3 l. pressure oven. After 1.0 part of a palladium catalyst (Pd,: 5%, carrier: active carbon) was added to it and the oven was flushed with nitrogen, the reducing treatment was carried out at a hydrogen partial pressure of 0.5 atg. at 80° C. for 3 hours. The treated solution was filtered. By cooling 1/10 of the solution thus obtained, 48 parts of purified BHET was obtained. Its absorbency was 0.12. To the remaining solution, 8 g. of active carbon (the special grade Sakura, was added and then the solution was agitated for 15 minutes before it was filtered. That operation was repeated three times. The solution thus obtained was cooled. As a result, 400 parts of refined BHET was produced. Its absorbency was 0.028. As the result of polymerizing it similarly to Example 1, a polyethylene terephthalate of a high quality, having an intrinsic viscosity of 0.63, a Hazen number of 80 and a melting point of 263° C. was obtained.

What is claimed is:

1. A method for treating crude bis-$\beta$-hydroxyethyl terephthalate which comprises reducing an aqueous solution of crude bis-$\beta$-hydroxyethyl terephthalate by hydrogen gas in the presence of a catalyst selected from the group consisting of platinum, palladium, rhodium, ruthenium, nickel and cobalt, said crude bis-$\beta$-hydroxyethyl terephthalate having been obtained by reacting ethylene oxide with crude terephthalic acid in turn having been obtained by air oxidation of para-xylene or by reacting potassium benzoate under a pressure of carbon dioxide gas using cadmium oxide as a catalyst.

2. A method for treating crude bis-$\beta$-hydroxyethyl terephthalate which comprises reducing at a temperature in the range 50° C. to 100° C., an aqueous solution of crude bis-$\beta$-hydroxyethyl terephthalate by blowing hydrogen gas through said solution which contains in suspension from 0.01 to 2 weight percent of a powdered catalyst selected from the group consisting of platinum, palladium, rhodium, ruthenium, nickel, and cobalt, said crude bis-$\beta$-hydroxyethyl terephthalate having been obtained by reacting ethylene oxide with crude terephthalic acid in turn having been obtained by air oxidation of para-xylene or by reacting potassium benzoate under a pressure of carbon dioxide gas using cadmium oxide as a catalyst.

3. A method for treating crude bis-$\beta$-hydroxyethyl terephthalate which comprises reducing at a temperature in the range 50° C. to 100° C., an aqueous solution of crude bis-$\beta$-hydroxyethyl terephthalate by allowing said aqueous solution to flow down a column packed with a catalyst selected from the group consisting of platinum, palladium, rhodium, ruthenium, nickel and cobalt in the form of granules while simultaneously passing hydrogen gas through said column, said crude bis-$\beta$-hydroxyethyl terephthalate having been obtained by reacting ethylene oxide with crude terephthalic acid in turn having been obtained by air oxidation of paraxylene or by reacting potassium benzoate under a pressure of carbon dioxide gas using cadmium oxide as a catalyst.

4. A method for treating crude bis-$\beta$-hydroxyethyl terephthalate which comprises reducing an aqueous solution of crude bis-$\beta$-hydroxyethyl terephthalate by hydrogen gas in the presence of a catalyst selected from the group consisting of platinum, palladium, rhodium, ruthenium, nickel and cobalt and then further purifying the treated solution with active carbon, said bis-$\beta$-hydroxyethyl terephthalate having been obtained by reacting ethylene oxide with crude terephthalic acid in turn having been obtained by air oxidation of para-xylene or by reacting potassium benzoate under a pressure of carbon dioxide gas using cadmium oxide as a catalyst.

5. A method for treating crude bis-$\beta$-hydroxyethyl terephthalate which comprises reducing, at a temperature in the range 50° C. to 100° C., an aqueous solution of crude bis-$\beta$-hydroxyethyl terephthalate by allowing said aqueous solution to flow down a column packed with a catalyst selected from the group consisting of platinum, palladium, rhodium, ruthenium, nickel and cobalt deposited on a carrier selected from the group consisting of active carbon, asbestos and diatomaceous earth while simultaneously passing hydrogen gas through said column, said crude bis-$\beta$-hydroxyethyl terephthalate having been obtained by reacting ethylene oxide with crude terephthalic acid in turn having been obtained by air oxidation of para-xylene or by reacting potassium benzoate under a pressure of carbon dioxide gas using cadmium oxide as a catalyst.

References Cited

UNITED STATES PATENTS 3,058,997  10/1962  Taylor et al. _____ 260—346.7

FOREIGN PATENTS 164,010  7/1953  Australia.

LORRAINE A. WEINBERGER, Primary Examiner

E. J. SKELLY, Assistant Examiner